(12) United States Patent
Beckham et al.

(10) Patent No.: US 6,191,215 B1
(45) Date of Patent: Feb. 20, 2001

(54) PROCESS FOR THE PREPARATION OF PULVERULENT POLYMERS BY POLYMERIZATION IN SUPERCRITICAL CARBON DIOXIDE IN THE PRESENCE OF POLYOXYALKYLENE-POLYSILOXANE COPOLYMERS

(75) Inventors: Eric Beckham, Aspinwall, PA (US); Ralf Fink, Limburgerhof; Volker Hildebrandt, Mannheim, both of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/262,590

(22) Filed: Mar. 5, 1999

(51) Int. Cl.[7] ........................................ C08G 5/54
(52) U.S. Cl. .................... 524/731; 524/850; 524/853; 524/849
(58) Field of Search .................... 524/731, 850, 524/853, 849

(56) References Cited

U.S. PATENT DOCUMENTS

| 5,216,070 | 6/1993 | Plochocka et al. | 524/801 |
| 5,312,882 | 5/1994 | Desimone et al. | 526/201 |
| 5,506,317 | 4/1996 | Desimone et al. | 526/201 |
| 5,733,964 | * 3/1998 | Johnston et al. | 524/505 |
| 5,789,505 | * 8/1998 | Wilkinson et al. | 526/209 |

FOREIGN PATENT DOCUMENTS

| 633018 | 1/1995 | (EP) . |
| 96/37535 | 11/1996 | (WO) . |
| WO 97/14720 | 4/1997 | (WO) . |

* cited by examiner

*Primary Examiner*—Margaret G. Moore
(74) *Attorney, Agent, or Firm*—Keil & Weinkauf

(57) ABSTRACT

Process for the preparation of pulverulent polymers by polymerization in supercritical carbon dioxide in the presence of polyoxyalkylene-polysiloxane copolyers The invention relates to a process for the preparation of pulverulent polymers by polymerization of ethylenically unsaturated monomers (a) in supercritical carbon dioxide as inert diluent, where the polymerization is carried out in the presence of polyoxyalkylene-polysiloxane copolymers.

13 Claims, No Drawings

PROCESS FOR THE PREPARATION OF PULVERULENT POLYMERS BY POLYMERIZATION IN SUPERCRITICAL CARBON DIOXIDE IN THE PRESENCE OF POLYOXYALKYLENE-POLYSILOXANE COPOLYMERS

Process for the preparation of pulverulent polymers by polymerization in supercritical carbon dioxide in the presence of polyoxyalkylene-polysiloxane copolymers The present invention relates to a process for the preparation of pulverulent polymers by polymerization of ethylenically unsaturated monomers (a) supercritical carbon dioxide as inert diluent.

Supercritical carbon dioxide is a highly suitable solvent or inert diluent for a large number of polymerization reactions. Because of its favorable cost, nonflammability and good compatibility with the environment, supercritical carbon dioxide has many advantages over conventional organic solvents. In addition, supercritical carbon dioxide has low viscosity and surface tension and thus offers the advantages of a more favorable mass transfer, and, moreover, is easier to remove from the polymerization product than is, for example, water. Despite all these advantages, its use is frequently restricted due to its low solvency for polar substances, In order to overcome this disadvantage, amphiphilic compounds are generally added to the polymerization medium which have a $CO_2$-compatible moiety and a suitable polar content.

US-A 5 312 882 and US-A 5 506 317 describe heterophase polymerizations of hydrophobic monomers in supercritical carbon dioxide in the presence of fluorine- or silicone-containing stabilizers.

WO 96/37535 discloses the preparation of poly(phenyl oxides) by polymerization in supercritical carbon dioxide in the presence of fluorine- or silicone-containing stabilizers.

However, these stabilizers known to date are, in the case of the fluorine-containing compounds, costly, are sometimes not approved for desired fields of use, are difficult to obtain experimentally, and are disadvantageous with respect to environmental compatibility.

EP-A 633 018 discloses the use of polyoxyalkylenepolydimethylsiloxanes as additive for the stabilization of cosmetic emulsions.

It is an object of the present invention to find stabilizers which help to overcome said disadvantages.

We have found that this object is achieved by a process for the preparation of pulverulent polymers by polymerization of ethylenically unsaturated monomers (a) in supercritical carbon dioxide as inert diluent, which comprises carrying out the polymerization in the presence of polyoxyalkylene-polysiloxane copolymers.

According to the invention, suitable stabilizers are polyoxyalkylene-polysiloxane copolymers, which can either be graft or block copolymers.

Suitable copolymers of the graft type have a structure of the formula I,

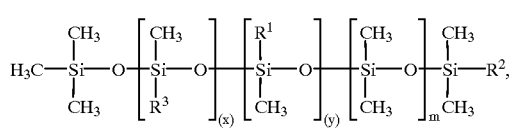

(I)

suitable copolymers of the block type a structure of the formula II

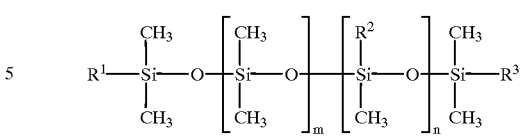

(II)

where $R^1$ and $R^2$ independently of one another are a hydrogen atom, a $C_1$–$C_6$-alkyl radical or a branched or unbranched poly(dimethylsiloxane) radical having up to 40 siloxane units, $R^3$ is a polyoxyalkylene radical having from 3 to 20 oxyalkylene units, and m, n, x, and y independently of one another are an integer from 1 to 1000.

Preferred radicals $R^1$ and $R^2$ are $C_1$–$C_5$-alkyl radicals. $R^3$ is preferably a polyoxyethylene radical. The end group of $R^3$ can be a hydroxyl group, an alkyl ether group having from 1 to 5 carbon atoms or a trimethylsiloxy group.

Preferred values for m n, x and y are from 10 to 350.

The preparation of such polyoxyalkylene-polysiloxane copolymers by hydrosilylation in the presence of a platinum-containing catalyst is known per se (cf. J. B. Plumb and J. H. Atherton, Block Copolymers, publisher; D. C. Allport and W. H. Janes, Applied Science Publishers Ltd., London, 1973, page 305–325).

They can be obtained, for example, by reaction of corresponding poly(dimethylsiloxane-methylhydrosiloxanes) with monoallylpolyalkylene oxides in the presence of a platinum catalyst, where appropriate also by additional reaction with a vinylpoly(dimethylsiloxane) to obtain branched structures.

Examples of suitable platinum-containing catalysts are: platinum-divinyltetramethyldisiloxane, platinum/cyclovinylmethylsiloxane complex (2–2.5% Pt concentration in xylene), platinum/carbonyl complex (3–3.5% in vinyl-terminated polydimethylsiloxane) or $H_2(PtCl_6)*6H_2O$ (hexachloroplatinic(IV) acid hexahydrate.

The polyoxyalkylene-polysiloxane copolymers generally have molecular weights in the range of 500–30,000 g/mol.

Suitable reactive methylhydrosiloxanes are, in particular,

The polyoxyalkylene-polysilicane copolymers generally have molecular weights in the range of 500–30,000 g/mol.

Suitable reactive methylhydrosiloxanes are, in particular, hydrogen-terminated poly(dimethylsiloxanes) with a molecular weight of $10^2$–$2.5\times10^4$ g/mol, and poly (dimethylsiloxanemethylhydrosilanes) with a molecular weight of $10^2$–$2.5\times10^4$ g/mol and a methylhydrosiloxane content of from 0.5 to 30 mol %. Suitable alkyl radicals $R^1$ and $R^2$ are methyl, ethyl, propyl, isopropyl, butyl, isobutyl, pentyl, isopentyl, or hexyl radicals. Branched or unbranched poly(dimethysiloxane) radicals $R^1$ and $R^2$ are introduced via reactive vinyl precursors; suitable precursors are, in particular, vinyldiethylmethylsilane, vinyldimethylethoxysilane, vinylethyldimethylsilane, vinyltrimethylsilane, vinyltriethyltilane, (N-vinylformamido)trimethylsilane, vinylmethylbis (trimethylsiloxy)silane, vinylmethyldiacetoxysilane, vinylmethyldiethoxysilane, vinylmethyldimethoxysilane, vinylmethylsilacyclopentane, vinyloxytrimethylsilane, vinylpentamethyldisiloxane, vinyltriacetoxysilane, vinyltri-t-butoxysilane, vinyltriethoxysilane, vinyltrimethoxysilane, vinyltriisopropoxysilane, vinyltrimethoxysilane, vinyltris(2-methoxyethoxy)silane, vinyltris(trimethylsiloxy)silane and vinyl-terminated poly(dimethylsiloxanes) with molecular weights of up to 3000 g/mol.

Suitable reactive precursors for introducing the branched or unbranched poly(oxyalkylene) radical $R^3$ into the copolymer are monoallylpolyoxyalkylene ethers with a molecular weight of from 100 to 1000 g/mol, preferably from 300 to 600 g/mol. These can carry, as end groups, a hydroxyl group, a $C_1$–$C_5$-alkoxy group or a trimethylsiloxy group, methoxy and ethoxy groups being preferred. said precursors are commercially available.

According to the invention, suitable polyoxyalkylenepolysiloxane copolymers are, for example:

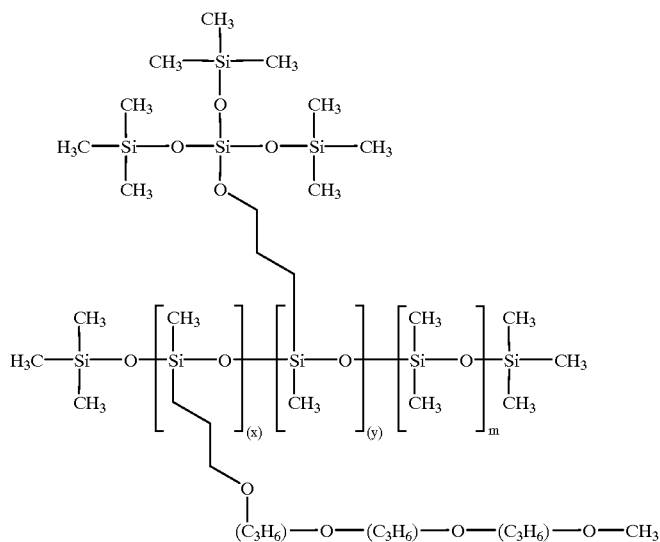

$(x+y)=6$ $x=1, 2, 3$, $m=200$–$250$

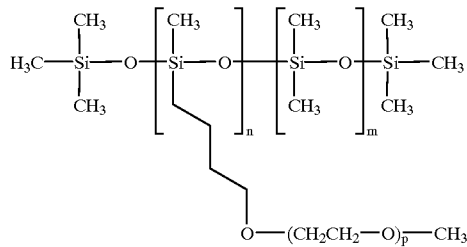

n=7 to 8 (p=3, 7, 12), m=200–250

The polymerization is carried out under pressure in supercritical carbon dioxide as inert diluent. The properties of carbon dioxide in the liquid and in the supercritical state have been reported by J. A. Hyatt, J. Org. Chem. 49, 5097–5101 (1984). According to this, the critical point of carbon dioxide lies at about 31° C. and 73 bar. The polymerization is preferably carried out under pressure in supercritical carbon dioxide at temperatures above 31° C., the critical temperature of the carbon dioxide. The upper limit for the preparation of the polymers is regarded as the temperature which is 10° C. above the start of the softening range of the particular polymer being formed. The upper value for this temperature limit is 150° C. for most polymers. The polymerization is advantageously carried out in the temperature range from 30 to 130° C. The reaction temperature does not have to be kept contant; it is also possible to use a staged or ramped temperature profile. At the start of the reaction, temperatures in the range from 31 to 100° C. are advisable. The pressures are above 73 bar, preferably in the range from 80 to 400 bar, particularly preferably from 120 to 350 bar.

The process according to the invention is preferably carried out by firstly, in the reaction chamber, introducing carbon dioxide in the solid, liquid or gaseous state into pressurized apparatuses which are customary per se, then increasing the pressure to values above 73 bar and the temperature to values above 31° C. to covert the carbon dioxide into the supercritical state, then adjusting the reaction temperature and finally metering in the substances. The feed substances such as monomers, free-radical initiators, crosslinkers and, if appropriate, polymerization regulators can be metered in individually or as mixtures. Thus, for example, it may be advisable to dissolve the free radical initiators in the monomers. Which procedure is chosen essentially depends on the solubilities of the individual components in one another and in the diluent. It is, however also possible to change all or some of the feed substances into the reaction chamber and then to add the carbon dioxide. If desired, feed substances can be metered in over the course of the reaction (semibatch procedure).

The polymerization reaction is stated using polymerization initiators which dissociate into free radicals. It is possible to use all those initiators which are known for the polymerization of monomers. Suitable examples are initiators which dissociate into free radicals which have half lives of less than 3 hours at the temperature chosen in each case. If the polymerization is carried out at various temperatures, by firstly polymerization the monomers at a relatively low temperature and than completing polymerization at a significantly higher temperature, than at least two different initiators are expediently used which have an adequate rate of dissociation in the temperature range chosen in each case.

Based on 100 parts by weight of the monomer mixture, from 100 to 3,000, preferably from 200 to 15,00, parts by weight of carbon dioxide are used. It is advantageously anhydrous. The polymerization reaction can be carried out batchwise or also continuously by thoroughly mixing the reactants in an appropriately designed pressured apparatus. In order to dissipate the heat produced in the polymerization, it is desirable for the pressurized apparatus to have a cooling system. They must of course also be heatable in order to heat the reaction mixture of the particular temperature desired for the polymerization. The pressurized apparatus should have mixing devices, e.g. stirrers (blade, impeller, multistage impulse countercurrent, helical stirrer) or paddles.

The novel process permits the preparation of pulverulent crosslinked or noncrosslinked polymers consisting of
(a) from 90 to 100% by weight of monomers (a), and
(b) from 0 to 10% by weight of a crosslinking monomers.

Suitable polymerizable monomers (a) are ethylenically unsaturated monomers. In this connection, it is possible to use either a single monomer or combinations of two or more monomers. Polymerizable is taken to mean that the monomers used can be polymerized using any conventional synthetic method.

For example, this can be solution polymerization and heterophase polymerization such as emulsion polymerization, suspension polymerization or precipitation polymerization, without the methods which can be used being limited thereto.

Monomers which can be polymerized by free-radical-initiated reaction are preferable. The term ethylenically unsaturated means that the monomers have at least one polymerizable carbon-carbon double bond, which can be mono-, di-, tri-, or tetrasubstituted.

Suitable monomers (a) are, for example, vinylidene chloride; and hydrocarbons having at least one carbon-carbon double bond, preferably styrene, alpha-methylstyrene, tert-butylstyrene, butadiene, isoprene, cyclohexadiene, ethylene, propylene, 1-butene, 2-butene, isobutylene, vinyltoluene, and mixture of these monomers.

Suitable monomers can, for example, also be the reaction products of unsaturated acids, such as acrylic acid or methacrylic acid, with a quaternized epichlorohydrin of the formula (III) ($R^4$=$C_1$- to $C_{40}$-alkyl).

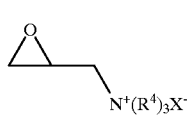

(III)

Examples thereof are, for example; (meth)acryloyloxyhydroxy-propyltrimethylammonium chloride and (meth)acryloyloxy-hydroxypropyltriethylammonium chloride.

The monomers (a) of the present ionvention can constitute from 90 to 100% by weight, preferably from 95 to 99.5% by weight, particualrly preferable from 98 to 99.9% by weight.

The preferred ethylenically unsaturated monomers (a) can be described by the following formula IV:

$$X—C(O)CR^5=CHR^6 \quad (IV)$$

where
X is chosen from the group of radicals —OH, —OM, —$OR^7$, $NH_2$, —$NHR^7$, $N(R^7)_2$;
M is a cation chosen from the group consisting of: Na+, K+, Mg++, Ca++, Zn++, $NH_4$+, alkylammonium, dialkylammonium, trialkylammonium and tetraalkylammonium;
$R^5$ and $R^6$ independently of one another are chosen from the group consisting of —H, $C_1$–$C_8$ linear or branch-chain alkyl chains, methoxy, ethoxy, 2-hydroxyethoxy, 2-methoxyethoxy, cyano and carboxyl.
The radicals $R^7$ are identical or different and are chosen from the group consisting of —H, $C_1$–$C_{40}$ linear or branch-chain alkyl radicals, N,N-dimethylaminoethyl, 2-hydroxyethyl, 2-methoxyethyl, 2-ethoxyethyl, hydroxypropyl, methoxypropyl or ethoxypropyl.
Representative but nonlimiting examples of suitable monomers (a) are, for example, acrylic acid and salts, esters and amides thereof. The salts can be derived from any desired nontoxic metal, ammonium or substituted ammonium counterions.

The esters can be derived from $C_1$–$C_{40}$ linear, $C_3$–$C_{40}$ branches-chain, or $C_3$–$C_{40}$ carbocyclic alcohols, from multifunctional alcohols having from 2 to about 8 hydroxyl groups, such as ethylene glycol, hexylene glycol, glycerol, and 1,2,6-hexanetriol, from aminoalcohols or from alcohol ethers such as methoxyethanol and ethoxyethanol or polyethylene glycols.

Preference is also given to N,N-dialkylaminoalkyl acrylates and methacrylates and N-dialkylaminoalkylacrylamides and N-dialkylaminoalkylmethacrylamides of the formula (V)

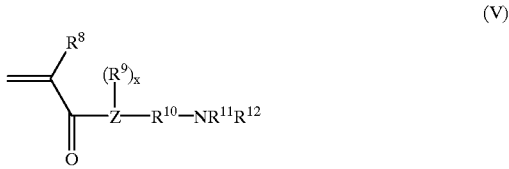

(V)

where $R^8$=H, alkyl having from 1 to 8 carbon atoms,
$R^9$=H, methyl
$R^{10}$=alkylene having from 1 and 24 carbon atoms, optionally substituted by alkyl
$R^{11}$, $R^{12}$=$C_1$–$C_{40}$-alkyl radical
Z=nitrogen where x=1, or oxygen where x=0.

The amides can be unsubstituted, N-alkyl- or N-alkylamino-monosubstituted or N,N-dialkyl-substituted or N,N-dialkylamino-disubstituted, where the alkyl or alkylamino groups are derived from $C_1$–$C_{40}$ linear, $C_3$–$C_{40}$ branched-chain, or $C_3$–$C_{40}$ carbocyclic units. Additionally, the alkylamino groups may be quaternized.

Preferred monomers of the formula V are N,N-dimethylaminomethyl (meth)acrylate, N,N-diethylaminomethyl (meth)acrylate, N,N-dimethylaminoethyl (meth)acrylate, N,N-diethylaminoethyl (meth)acrylate.

These preferred monomers (a) also include substituted acrylic acids and salts, esters and amides thereof, the substituents on the carbon atoms being in the two or three position of the acrylic acid, and independently of one another being chosen from the group consisting of $C_1$–$C_4$ -alkyl, —CN, COOH, particularly preferably methacrylic acid, ethacrylic acid and 3-cyanoacrylic acid, These salts, esters and amides of the substituted acrylic acids can be chosen as described above for the salts, esters and amides of acrylic acid.

Other suitable monomers (a) are vinyl and allyl esters of $C_1$–$C_{40}$ linear, $C_3$–$C_{40}$ branched-chain or $C_3C_{40}$ carbocyclic carboxylic acids (e.g. vinyl acetate, vinyl propionate, vinyl neononanoate, vinyl neoundecanoic acid and vinyl t-butylbenzoate); vinyl or allyl halides, preferably vinyl chloride and allyl chloride, vinyl ethers, preferably methyl, ethyl, butyl or dodecyl vinyl ethers, vinylformamide, vinylmethylacetamide, vinylamine; vinyllactams, preferably vinylpyrrolidone and vinylcaprolactam, vinyl- or allyl-substituted heterocyclic compounds, preferably vinylpyridine, vinyloxazoline and allylpyridine.

Also suitable are N-vinylimidazoles of the formula VI, where $R^{14}$ to $R^{16}$ independently of one another are hydrogen, $C_1$–$C^4$-alkyl or phenyl:

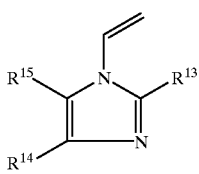

(VI)

Other suitable monomers (a) are diallylamines of the formula (VII)

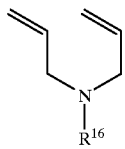

(VII)

where $R^{16}=C_1$ to $C_{24}$ alkyl.

Particularly preferred monomers (a) are acrylic acid, methacrylic acid, ethacrylic acid, methyl acrylate, ethyl acrylate, propyl acrylate, n-butyl acrylate, isobutyl acrylate, t-butyl acrylate, 2-ethylhexyl acrylate, decyl acrylate, methyl methacrylate, ethyl methacrylate, propyl methacrylate, n-butyl methacrylate, isobutyl methacrylate, t-butyl methacrylate, 2-ethylhexyl methacrylate, decyl methacrylate, methyl ethacrylate, ethyl ethacrylate, n-butyl ethacrylate, isobutyl ethacrylate, t-butyl ethacrylate, 2-ethylhexyl ethacrylate, decyl ethacrylate, 2,3-dihydroxypropyl acrylate, 2,3-dihydroxypropyl methacrylate, 2-hydroxyethyl acrylate, hydroxypropyl acrylates, 2-hydroxyethyl methacrylate, 2-hydroxyethyl ethacrylate, 2-methoxyethyl acrylate, 2-methoxyethyl methacrylate, 2-methoxyethyl ethacrylate, 2-ethoxyethyl methacrylate, 2-ethoxyethyl ethacrylate, hydroxypropyl methacrylates, glyceryl monoacrylate, glyceryl monomethacrylate, polyalkylene glycol (meth)acrylates, unsaturated sulfonic acids such as, for example, acrylamidopropanesulfonic acid;

acrylamide, methacrylamide, ethacrylamide, N-methylacrylamide, N,N-dmethylacrylamide, N-ethylacrylamide, N-isopropylacrylamide, N-butylacrylamide, N-t-butylacrylamide, N-octylacrylamide, N-t-octylacrylamide, N-octadecylacrylamide, N-phenylacrylamide, N-methylmethacrylamide, N-ethylmethacrylamide, N-dodecyl-methacrylamide, 1-vinylimidazole, 1-vinyl-2-methylimidazole, N,N-dimethylaminomethyl (meth)acrylate, N,N-diethylaminomethyl (meth)acrylate, N,N-dimethylaminosethyl (meth)acrylate, N,N-diethylaminoethyl (meth)acrylate, N,N-dimethylaminobutyl (meth)acrylate, N,N-diethylaminobutyl (meth)acrylate, N,N-dimethylaminohexyl (meth)acrylate, N,N-dimethylaminooctyl (meth)acrylate, N,N-dimethylaminododecyl (meth)acrylate, N-[3-(dimethylamino)propyl]methacrylamide, N-[3-(dimethylamino)propyl]acrylamide, N-[3-(dimethylamino)butyl] meth-acrylamide, N-[8-(dimethylamino)octyl] methacrylamide, N-[12-(dimethylamino)dodecyl] methacrylamide, N-[3-(diethyl-amino)propyl] methacrylamide, N-[3-(diethylamino)propyl]-acrylamide;

Maleic acid, fumaric acid, maleic anhydride and its monoesters, crotonic acid, itaconic acid, diallyldimethylammonium chloride, vinyl ethers (for example: methyl, ethyl, butyl, or dodecyl vinyl ethers), vinylformamide, vinylmethylacetamide, vinylamine; methyl vinyl ketone, maleimide, vinylpyridine, vinylimidazole, Vinylfuran, styrene, stryenesulfonate, allyl alcohol, and mixtures thereof.

Of these, very particular preference is given to acrylic acid, methacrylic acid, maleic acid, fumaric acid, crotonic acid, maleic anhydride and its monoesters, methyl acrylate, methyl methacrylate, ethyl acrylate, ethyl methacrylate, n-butyl acrylate, n-butyl methacrylate, t-butyl acrylate, t-butyl methacrylate, isobutyl acrylate, isobutyl methacrylate, 2-ethylhexyl acrylate, N-t-butyacrylamide, N-octylacrylamide, 2-hydroxyethyl acrylate, hydroxypropyl actylate, 2-hydroxyethyl methacrylate, hydroxypropyl methacrylate, alkylene glycol (meth)acrylates, unsaturated sulfonic acids such as, for example, acrylamidopropanesulfonic acid, vinylpyrrolidone, vinylcaprolactam, vinyl ethers (e.g.: methyl, ethyl, butyl, or dodecyl vinyl ethers), vinylformamide, vinylmethylacetamide, vinylamine, 1-vinylimidazole, 1-vinyl -2-methylimidazole, N,N-dimethyl-aminomethyl methacrylate and N-[3-(dimethylamino)propyl]-methacrylamide; 3-methyl-1-vinylimidazolium chloride, 3-methyl-1-vinylimidazolium methylsulfate, N,N-dimethylaminoethyl methacrylate, N-[3-(dimethylamino)propyl]methacrylamde quarternized with methyl chloride, methyl sulfate or diethyl sulfate.

Monomers containing a basic nitrogen atom can be quarternized in the following way:

Examples of suitable compounds for quaternizing the amines are alkyl halides having from 1 to 24 carbon atoms in the alkyl group, e.g. methyl chloride, methyl bromide, ethyl iodide, ethyl chloride, ethyl bromide, propyl chloride, hexyl chloride, dodecyl chloride, lauryl chloride and benzyl halides, in particular benzyl chloride and benzyl bromide. Other suitable quaternizing agents are dialkyl sulfates, in particular dimethyl sulfate or diethyl sulfate. The quaternization of the basic amines can also be carried out using alkylene oxides such as ethylene oxide or propylene oxide in the presence of acids. Preferred quaternizing agents are: methyl chloride, dimethyl sulfate or diethyl sulfate.

The quaternization can be carried out before the polymerization or after the polyermization.

The basic monomers can also be cautioned, by neutralizing them with mineral acids, for examples sulfuric acid, hydrochloric acid, hydrobromic acid, hydroiodic acid, phosphoric acid or nitric acid, or with organic acids, for example formic acid, acetic acid, lactic acid, or citric acid.

In the polymerization of the monomers (a), it is also possible, where appropriate, for other polymers such as, for example, polyamides, polyurethanes, polyesters, homo- and copolymers of ethylenically unsaturated monomers to be present.

These or other polymers can also be admixed with the novel polymer preparations following polymerization.

The novel monomers (a), provided they contain ionizable groups, can, before or after polymerization, be partially or completely neutralized using acids or bases in order, for example, to adjust the solubility or dispersibility in water to a desired level.

Suitable crosslinkers (monomers (b)) are, for example, acrylic esters, methacrylic esters, allyl ethers or vinyl ethers of at least dihydric alcohols. The OH groups of the parent alcohols can be completely or partially etherified or esterified; but the crosslinkers contain a least two ethylenically unsaturated groups.

Example of parent alcohols are dihydric alcohols, such as 1,2-ethanedio, 1,2-propanediol, 1,3-butanediol, 2,3-butanediol, 1,4-butanediol, but-2-ene-1,4-diol, 1,2-pentanediol, 1,5-pentanediol, 1,2-hexanediol, 1,5-hexanediol, 1,10-decanediol, 1,2-dodecanediol, 1,12-dodecanediol, neopentyl glycol, 3-methylpetane-1,5-diol, 2,5-dodecanediol, 1,12-dodecanediol, neopentylglycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, mononeopentyl glycol hydroxyppivalate, 2,2-bis(4-hydroxyphenyl)-propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thio-pentane-1,5-diol, and polyethylene glycols, polypropylene glycols and polytetrahydrofurans with molecular weights of in each case from 200 to 10,000. As well as the homopolymers of ethylene oxide or propylene oxide, it is also possible to use block copolymes of ethylene oxide or propylene oxide or copolymers which contain incorporated ethylene oxide and propylene oxide groups. Examples of parent alcohols having more than two OH groups are trimethylolpropane, glycerol, pentaerythritol, 1,2,5-pentane-triol, 1,2,6-hexanetriol, triethoxycyanuric acid, sorbitan, sugars such as sucrose, glucose, mannose. It is of course also possible to use the polyhydric alcohols following reaction with ethylene oxide or propylene oxide as the corresponding ethhoxylates or propoxylates, respectively. The polyhydric alcohols can also be firstly converted into the corresponding glycidyl ethers by reaction with epichlorohydrin.

Other suitable crosslinkers are the vinyl esters or the esters of monohydric, unsaturated alcohols with ethylenically unsaturated $C_3$–$C_3$-carboxylic acids, for example acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamic alcohol, citronellol, crotyl alcohol or cis-9-octadecen-1ol. It is, however, also possible to esterify the monohydric, unsaturated alcohols using polybasic carboxylic acids, for example malonic acid, tartaric acid, trimellitic acid, phthalic acid, terephthalic acid, citric acid or succinic acid.

Other possible crosslinkers are esters of unsaturated carboxylic acids with the above-described polyhydric alcohols, for example oleic acid, crotonic acid, cinnamic acid, or 10-undecenoic acid.

Also, suitable are straight-chain or branched, linear or cyclic, aliphatic or aromatic hydrocarbons which have at least two double bond, which in the case of aliphatic hydrocarbons must not be conjugated, e.g. divinylbenzene, divinyltolune, 1,7-octadiene, 1,9-decadiene, 4-vinyl-1-cyclohexene, trivinylcylohexane or polybutadeienes with molecular weights of from 200 to 20,000.

Other suitable crosslinkers are acrylamides, methacrylamides and N-allylamines of at least difunctional amines. Such amines are, for example, 1,2-diaminomethane, 1,2-diaminoethane, 1,3-diamino-propane, 1,4-diaminobutane, 1,6-diaminohexane, 1,12-dodecane-diamine, piperazine, diethylenetriamine or isophoroediamine. Also suitable are the admides of allylamine and unsaturated carboxylic acids such as acrylic acid, methacrylic acid, itaconic acid, maleic acid, or at least dibasic carboxylic acids are described above.

Other suitable crosslinkers are triallylamine and triallyl-monoalkylammonium salts, e.g. triallylmethylammonium chloride or triallylmethylammonium methylsulfate.

Also suitable are N-vinyl compounds of urea derivatives, at least difunctional amides, cyanurates or urethanes, for example of urea, ethyleneurea, propyleneurea or tartramide, e.g. N,N'-divinylethyleneurea or N,N'-divinylpropyleneurea.

Also suitable are alkylenebisacrylamides such as methylenebis-acrylamide and 1,1'-bis(3,3'-vinyl-benzimidazolin-2-one)-1,4-butane.

Other suitable crosslinkers are, for example, alkylene glycol di(meth)acrylates, such as ethylene glycol diacrylate, ethylene glycol dimethyacrylate, tetraethylene glycol acrylate, tetraethylene glycol dimethyacrylate, diethylene glycol acrylate, diethylene glycol methacrylate, vinyl acrylate, allyl acrylate, allyl methacrylate, divinyldioxane, pentaerythritol triallyl ether and mixtures of the crosslinkers.

Other suitable crosslinkers are divinyldioxane, tetraallylsilane or tetravinylsilane.

particularly preferred crosslinkers are, for example, methylene-bisacrylamide, triallylamine and triallylalkylammonium salts, divinylimidazole, N,N'-divinylethyleneurea, reaction prdoucts of polyhydric alcohols with acrylic acid or methacrylic acid, methacrylic esters and acrylic esters of polyalkylene oxides or polyhydric alcohols which have been reacted with ethylene oxide. and/or propylene oxide and/or epichlorohydrin. Very particularly preferrer crosslinkers are methylenebisacrylamide, N,N'-divinyl-ethyleneurea and acrylic esters of clycol, butanediol, trimethylolpropane or glycerol, or acrylic esters of butanediol, trimethylolpropane, glycerol or glycol reacted with ethylene oxide and/or epichlorohydrin.

The crosslinker is preferably soluble in the reaction medium. If the solubility of the corsslinker in the reaction medium is low, it can be dissolved in a monomer or in a monomer mixture or else be metered in dissolved in a solvent which is miscible with the reaction medium. Particular preference is giving to crosslinkers which are soluble in the monomer mixture.

The content of crosslinker can highly influence the solution viscosity of the novel polymers.

Initiators which can be used for the free-radical polymerization are water-soluble and water-insoluble peroxo and/or axo compounds, for example alkali metal or amonium peroxodisulfates, hydrogen peroxide, dibenzoyl peroxide, tert -butyl perpivalate, tert-butyl per-2-ethylnexanoate, 2,2'-azobis(2,4-dimethylvaleronitrile), tert-butyl peroxyneodecanoate, di-tert-butyl peroxide, tert-butyl hydroperoxide, azobisisobutyronitrile, azobis(2-amidinopropane) dihydrochloride or 2,2'-azobis(2-methylbutyronitrile). Also suitable are initiator mixtures or redox initiator systems, such as, for example ascorbic acid/iron(II) sulfate/sodium peroxodisulfate, tert-butyl hydroperoxide/sodium disulfite, ter-butyl hydroperoxide/sodium hydroxymethanesulfonate. The initiators can be used in the customary amounts for example from 0.05 to 7% by weight, based on the weight of the monomers to be polymerized.

The co-use of redux coinitiators, for example benzoin, deimethylaniline and organically soluble complexes and salts of heavy metals, such as copper, cobalt, manganese, nickel and chromium or, in particular, iron, enables the half-lives of said peroxides, in particular the hydroperoxides, to be reduced, so that, for example, tert-butyl hydroperoxide in the presence of 5 ppm of copper(II) acetylacetonate, is effective at temperatures as low as 100° C.

Preference is given to initiators which are sparingly soluble in water or insoluble in water.

Where appropriate, the polymerization can also be carried out in the presence of polymerization regulators in order to regulate the molecular weight of the polymer. If the desire is to prepare especially low molecular weight copolymers, relatively high amounts of polymerization regulators are used, while for the preparation of high molecular weight copolymers, only small amounts of polymerization regulators are used, or the process is carried out in the absence of these substances. Suitable polymerization regulators are, for example, 2-mercaptoethanol, mercaptopropanols, mercaptobutanals, thioglycolic acid, N-dodecylmercaptan, tert-dodecylmercaptan, thiophenol, mercaptopropionic acid, allyl alcohol and acetaldehyde. The polymerization regulators are used in an amount of from 0 to 10% by weight, preferably from 0 to 5% by weight, based on the monomers used.

The polymers obtainable by the novel process using the preferred monomers are suitable for use as viscosity modifiers (emulsifiers and dispersion auxiliaries), as W/O and O/W emulsifiers and generally as process auxiliaries, finishing auxiliaries or as superabsorbers, also as detergent additives such as incrustation and color transfer inhibitors, as retention auxiliaries in papermaking, as flocculating agents in water treatmetn or for use in the food technology sector, for example as filtration auxiliaries or complexing agents.

In particular, the polymers are also suitable as thickeners and gel formers in cosmetic formulations, especially hair-cosmetic preparations such as hair cures, hair lotions, hair rinses, hair emulsions, split-end fluids, neutralizing agent for permanent waves, "hot-oil treatment" preparations, setting lotions or hairsprays, in particular in conditioners.

Depending on the field of application, the hair-cosmetic prepartions can be applied as spray, foam, gel gelspray or mousse.

In addition, such polymers are also suitable as auxiliaries in pharmaceutical formulations, for example as table disintegrants.

The polymers prepared according to the invention are white, free-flowing powders having a uniform morphology, which have virtually no tendency toward tackiness.

The use of the polyoxyalkylene-polysiloxane copolymers according to the invention permits improvements in terms of polymerization rates, product properties and yields to be achieved. In particular, macroscopically improved products having more uniform particle size distributions and improved flow properties are obtained.

EXAMPLES

Preparation of a polyoxyalkylene-polysiloxane copolymer 2b)

10 g of a polymethylhydrodimethylsiloxane with a dimethylsiloxane content of 96.5% and a methylhydro content of 3.5% and a molecular weight of 13,000 g/mol and 2.28 g of an α-allyl ω-methoxypoly(ethylene glycol) either with a molecular weight of 350 g/mol were reacted in 60 ml of toluene in the presence of 200 mg of a platinum divinyltetramethyldisiloxane comples (as solution in xylene) at from 60 to 70° C. for 24 hours. The product was purified by column chromatography on aluminum oxide (basic surface) using activated carbon for decoloration,ible eluent used being tolune. This gave 4.7 g of a pale yellow oil (yield: 38%).

Compounds 1a) –c) and 2a) and c) were prepared analogously using the corresponding commerically available starting compounts.

EXAMPLES 1a) to c)

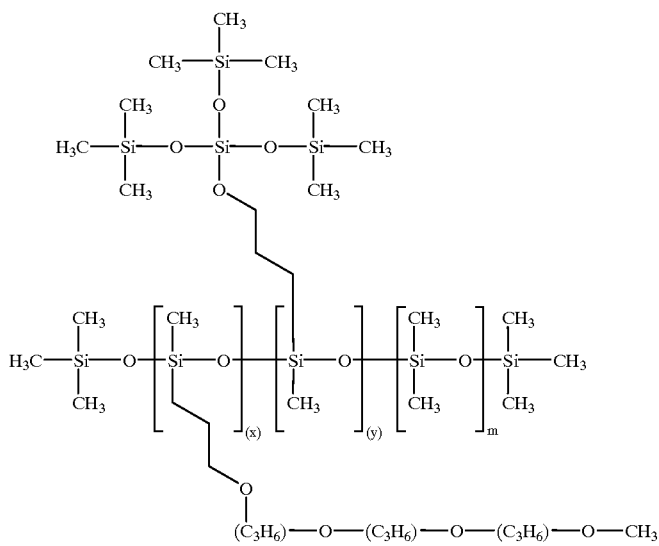

1a) x=1 y=5
1b) x=2 y=4
1c) x=3 y=3
Mean value of m: 30

Mean molecular weight: 2100 g/mol

EXAMPLES 2a)–c)

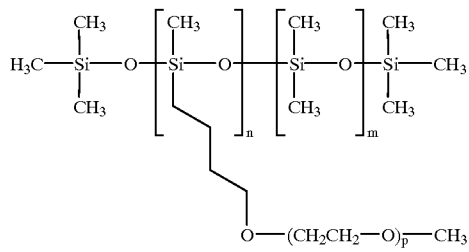

2a) p=3
2b) p=7
2c) p=12
Mean value of m: 180
n: 7–8

Preparation of the pulverulent polymers
General instructions

The feed substances were introduced into a pressurized reactor preheated to 35° C. The composition of the reaction medium is listed below the examples in each case. The reactor was then flushed with carbon dioxide for a few minutes in order to minimize the content of residual oxygen. The carbon dioxide was then brought into the supercritical state by increasing the pressure to 225 bar and increasing the temperature to 65° C. The reaction was continued until the pressure dropped, then the system was cooled to room temperature and the pressure was released.

The relative polymerization rates were determined using pressure change rates (cf. Beckman et al., Macromolecules 1997, 30, 745)

Preparation of polyvinylpyrrolidone

| N-Vinylpyrrolidone | 16% by weight |
|---|---|
| Azobisisobutyronitrile | 1% by weight |

For comparison, the polymerization was carried out without stabilizer.

Results are given in Table 1

Preparation of polyacrylic acid

Acrylic acid

Azobisisobutyronitrile

Stabilizer according to Example 1

Carbon dioxide ad 100% by weight

For comparison, the polymerization was carried out without stabilizer.

The results are given in Table 2

TABLE I

| Polysiloxane copolymer Ex. No. (conc.)+) | Relative reaction rate | Yield [% of theory] | Particle size [μm] | $M_w$ [g/mol] |
|---|---|---|---|---|
| 1a (2.5%) | 5.3 | 84 | 150–200 | — |
| 1b (2.5%) | 4.8 | 86 | 150–200 | $4.2 \times 10^5$ |
| 1c (2.5%) | 3.0 | 84 | 200–250 | — |
| 2a (2.5%) | 2.1 | 72 | 200–300 | $3.4 \times 10^5$ |
| 2b (0.8%) | 2.1 | 75 | 350–400 | $3.2 \times 10^5$ |
| 2b (1.25%) | 2.7 | 76 | 200–300 | $3.8 \times 10^5$ |
| 2b (2.5%) | 3.5 | 76 | 150–200 | $4.1 \times 10^5$ |
| 2b (3.8%) | 4.3 | 77 | 150–200 | — |
| 2c (2.5%) | 2.3 | 79 | 80–130 | $2.5 \times 10^5$ |
| For comp. (—) | 1.0 | 69 | a) | $1.9 \times 10^5$ |

+)based on the amount by weight of N-vinylpyrrolidone used
a) baked coarsely particulate polymer

TABLE 2

| Polysiloxane copolymer Ex. No. (conc.)+) | Relative reaction rate | Yield [% of theory] | Particle size [μm] | $M_w$ [g/mol] |
|---|---|---|---|---|
| 2b (1.25%) | 1.0 | 85 | 400–500 | $2.8 \times 10^6$ |
| 2b (2.5%) | 0.9 | 84 | 100–200 | $1.9 \times 10^6$ |
| For comp. (—) | 1.0 | 70 | 20–200 | $3.5 \times 10^6$ |

We claim:

1. A process for the preparation of pulverulent polymers by polymerization of ethylenically unsaturated monomers (a) in supercritical carbon dioxide as inert diluent, which comprises carrying out the polymerization in the presence of polyoxyalkylene-polysiloxane copolymers.

2. A process as claimed in claim 1, wherein the polyoxyalkylene-polysiloxane has a structure of the formula I,

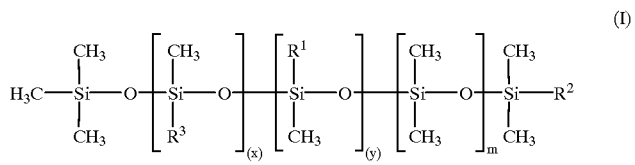

(I)

where $R^1$ and $R^2$ independently of one another are hydrogen, a $C_1$–$C_6$-alkyl radical or a poly(dimethylsiloxane) radical having up to 40 siloxane units, $R^3$ is a polyoxyalkylene radical having from 3 to 20 oxyalkylene units, and x, y and m independently of one another are a number from 1 to 1000.

3. A process as claimed in claim 2, wherein $R^1$ and $R^2$ are a $C_1$–$C_{16}$-alkyl radical.

4. A process as claimed in claim 2, wherein $R^3$ carries, as end group, a hydroxyl group, an alkoxy group or a trimethylsiloxy group.

5. A process as claimed in claim 1, wherein the polyoxyalkylene-polysiloxane has a structure of the formula II,

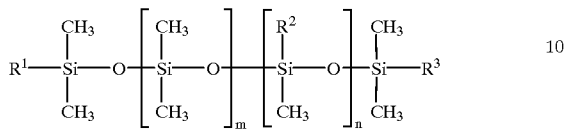
(II)

where $R^1$ and $R^2$ independently of one another are hydrogen, a $C_1$–$C_6$-alkyl radical or a poly(dimethylsiloxane) radical having up to 40 siloxane units, $R^3$ is a polyoxyalkylene radical having from 3 to 20 oxyalkylene units, and m and n independently of one another are a number from 1 to 1000.

6. The process of claim 5 where $R^1$ and $R^2$ are a $C_1$–$C_6$-alkyl group.

7. The process of claim 5 wherein $R^3$ carries as end group, a hydroxyl group, an alkoxy group or a trimethsiloxy group.

8. A process as claimed in claim 1, wherein the polyoxyalkylene-polysiloxane copolymers have molecular weights in the range from 500 to 30,000 g/mol.

9. A process as claimed in claim 1, wherein the polyoxyalkylene-polysiloxane is used in amounts of from 0.5 to 5% by weight, based on the amount of monomers.

10. A process as claimed in claim 1, wherein the monomers (a) polymerized are mmonomers of the formula IV $$X-C(O)CR^5=CHR^6 \quad (IV)$$

where

X is —OH, —OM, —OR$^7$, NH$_2$, —NHR$^7$ or N(R$^7$)$_2$,

M is a cation chosen from the group consisting of: Na+, K+, Mg++, Ca++, Zn++, NH$_4$+, alkylammonium, dialkylammonium, trialkylammonium and tetraalkylammonium, $R^5$ and $R^6$ independently of one another are chosen from the group consisting of —H, $C_1$–$C_8$ linear or branches-chain alkyl chains, methoxy, ethoxy, 2-hydroxyethoxy, 2-methoxyethoxy, cyano and carobyx, the radicals $R^7$ are idential or different and are chosen from the group consisting of —H, $C_1$–$C_{40}$ linear or branched-chain alkyl radicals, N,N-dimethylaminoethyl, 2-hydroxyethyl, 2-methoxyethyl, 2-ethoxyethyl, hydroxypropyl, methoxypropyl and ethoxypropyl, or of the formula V

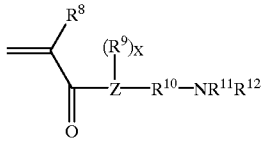
(V)

wherein $R^8$=H, alkyl having from 1 to 8 carbon atoms, $R^9$=H, methyl $R^{10}$=alkylene having from 1 to 24 carbon atoms, optionally substituted by alkyl $R^{11}$, $R^{12}$=alkyl radical Z=nitrogen where x=1, or oxygen where x=0, or mixtures of such monomers.

11. A process as claimed in claim 10, wherein the monomers (a) used are N-vinyllactams together with monomers of the formula IV or V or mixtures thereof.

12. A process as claimed in claim 1, wherein the monomers (a) used are N-vinyllactams or mixtures of N-vinyllactams and other monomers (a).

13. A process as claimed in claim 1, wherein up to 10% by weight of crosslinking monomers based on the total weight of monomers are additionally used.

* * * * *

UNITED STATES PATENT AND TRADEMARK OFFICE
CERTIFICATE OF CORRECTION

PATENT NO.: 6,191,215

DATED: February 20, 2001

INVENTOR(S): BECKHAM et al.

It is certified that error appears in the above-identified patent and that said Letters Patent is hereby corrected as shown below:

Col. 14, claim 3, line 67, "$C_1$-$C_{16}$-alkyl" should be --$C_1$-$C_6$-alkyl--.

Col. 15, claim 10, line 31, "mmonomers" should be --monomers--.

Col. 15, claim 10, line 41, "branches-" should be --branched- --.

Col. 16, claim 10, line 2, "carobyx" should be --carboxyl--.

Signed and Sealed this

Twenty-ninth Day of May, 2001

Attest:

NICHOLAS P. GODICI

Attesting Officer — Acting Director of the United States Patent and Trademark Office